Aug. 1, 1939.   G. CALUWE   2,167,743
FILTER FOR ARTESIAN WELLS OR BORE HOLES
Filed May 17, 1938
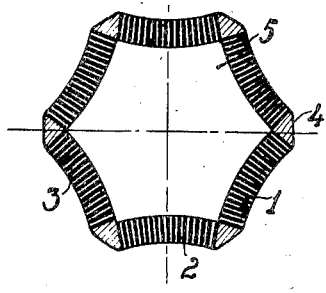
Inventor.
Georges Caluwé
per. J. Severs
Attorney.

Patented Aug. 1, 1939

2,167,743

UNITED STATES PATENT OFFICE 2,167,743

FILTER FOR ARTESIAN WELLS OR BORE HOLES

Georges Caluwe, Moll, Belgium

Application May 17, 1938, Serial No. 208,400
In Belgium May 22, 1937

1 Claim. (Cl. 166—5)

This invention relates to a filter particularly intended for artesian or bored wells, for the purpose of retaining the ground mass and draining the water.

According to the invention, the filter consisting in an apertured casing, the walls of which are formed with stacks of large lamellated plates arranged adjacent to each other in vertical position, so as to leave small interspaces of considerable depth, is characterized by the fact that the walls form in plan projection a polygonal figure with concave sides.

The stacks of plates are assembled according to any geometrical figure in plan projection, by means of a frame of rust-free material.

The filter can also be cast in one piece whereby all the plates as also the supporting frame can be assembled as a whole of convenient shape.

A form of embodiment has been diagrammatically illustrated in the accompanying drawing in which the figure is a horizontal section through the filter casing.

The different stacks of lamellated plates are assembled to form gratings 1, 2, 3, and are united by a framework, such as 4, constituted from rust-free material, so that the whole constitute a polygonal structure.

The plates 1 are arranged vertically adjacent to each other within the framework 4 with narrow interspaces, so that the ground mass is prevented from penetrating inside the casing, whereas the water can freely be sucked through the interspaces into the chamber 5 of the filter.

As illustrated, the sides or walls of the casing have an arched concave shape, so that by the use of plates of rectangular section, an enlargement of the interspaces is secured, which becomes progressively wider in the inward direction.

The lamellated plates are preferably manufactured from rust-free metal, glass or other material, which is not attacked by the water or by the substances dissolved therein.

I claim:

A filter for artesian wells and bore-holes consisting in an apertured casing the walls of which are formed with stacks of large lamellated plates arranged adjacent to each other in vertical position, so as to leave small interspaces of considerable depth, the walls forming in plan projection a polygonal figure with concave sides.

GEORGES CALUWE.